June 26, 1951 F. E. ROBINSON 2,558,389
BICYCLE SEAT
Filed May 17, 1946 2 Sheets-Sheet 1
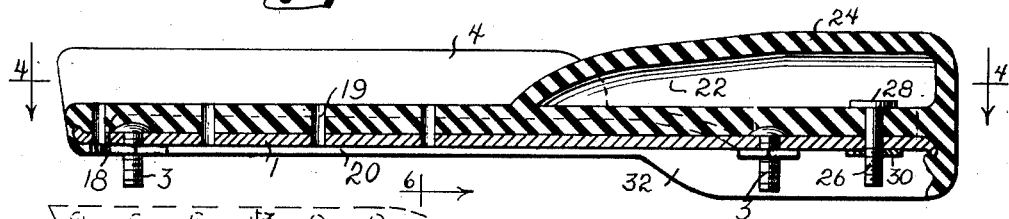
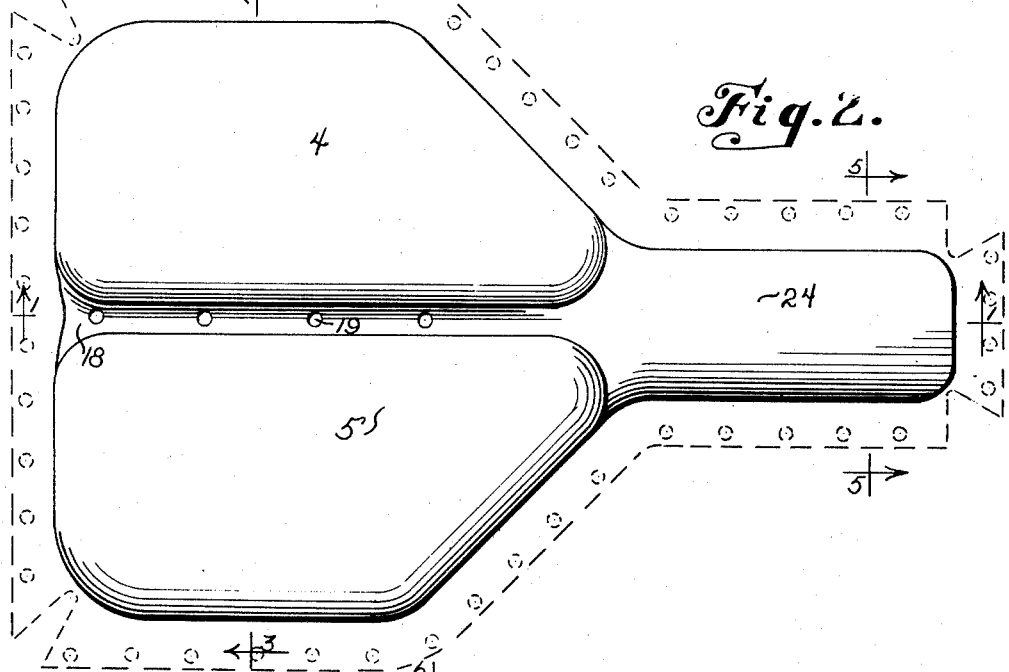
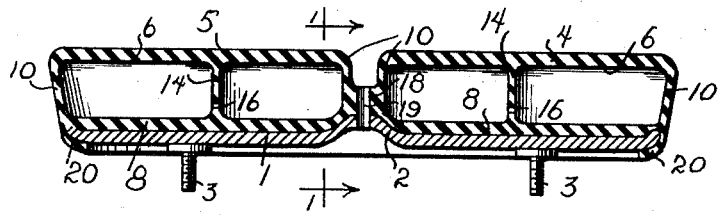
INVENTOR.
Frank E. Robinson
BY Victor J. Evans & Co.
ATTORNEYS June 26, 1951 F. E. ROBINSON 2,558,389
BICYCLE SEAT
Filed May 17, 1946 2 Sheets-Sheet 2
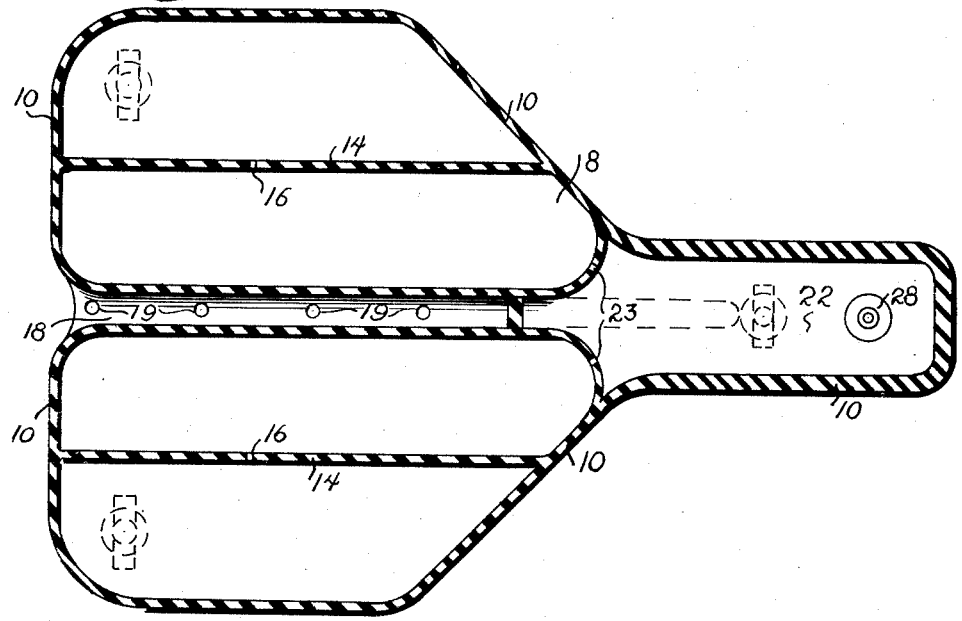
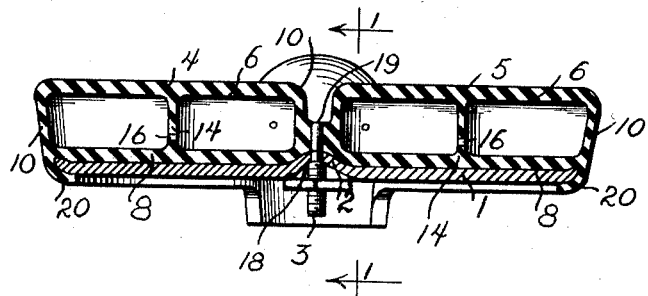
INVENTOR.
Frank E. Robinson
BY Victor J. Evans & Co.
ATTORNEYS Patented June 26, 1951

2,558,389

UNITED STATES PATENT OFFICE 2,558,389

BICYCLE SEAT

Frank E. Robinson, Hollywood, Calif.

Application May 17, 1946, Serial No. 670,430

1 Claim. (Cl. 155—5.15)

My present invention relates to an improved bicycle seat and more particularly to a seat having air compartments therein and means for inflating the compartments.

The seat of my invention may equally be used as original equipment or as replacement equipment and in either use will provide a comfortable air cushion for cyclists, both children and adults.

In the accompanying drawings I have illustrated one complete example of the physical embodiment of my invention according to the best mode I have thus far devised but it will be understood that various changes and alterations may be made in the exemplified structure within the scope of the appended claim.

In the drawings—

Figure 1 is a vertical longitudinal sectional view taken along line 1—1 of Figures 3 and 6.

Figure 2 is a top plan view thereof.

Figure 3 is a transverse vertical sectional view.

Figure 4 is a horizontal sectional view taken along line 4—4 of Figure 1.

Figure 5 is a vertical sectional view along line 5—5 of Figure 2.

Figure 6 is a transverse sectional view along line 6—6 of Figure 2.

Referring now to the drawings wherein like characters indicate like parts, I have illustrated the bicycle seat of my invention having a base 1 of metal or other suitable material formed with a longitudinally extending ridge 2 and the depending bolts 3 for attachment to the conventional seat support on bicycles.

The cushion for the base consists in the sections 4 and 5 having a top 6 and bottom 8 and side wall 10, the sections being divided by the vertical webs 14 having holes 16 for communication between the compartments formed by the webs.

The cushion is made of a suitable material as rubber flexible and inflatable, and impervious to air so that when inflated as hereinafter described the cushion will provide a comfortable seat.

A connecting rib 18 between the sections 4 and 5 provides openings 19 through which rivets may be extended to secure the cushion to the base. A flange 20 depends from the side wall 10 of the sections and is stretched over the outer periphery of the base 1 to assist in maintaining the cushion in position thereon.

In addition to the sections 4 and 5 I provide a nose compartment 22 having passages 23 leading to the cushion sections 4 and 5 and formed with a top 24. Valve 26 having the head 28 is located in the forward extension of the rib 18 and is secured therein by means of the lock nut 30. A widened portion 32 of the flange 20 extends around the forward portion of the nose and forms a protection for the valve.

In use the cushion may be inflated to the desired pressure and degree of resiliency by applying a pump or other suitable means to the valve whereupon the air under pressure will enter the nose chamber and thus pass through the passages 23 to the sections 4 and 5.

The seat cushion according to my construction will prove to be a comfortable and durable seat having a greater resiliency than padded material, and having the advantage of being inflated to such pressure as the cyclist may desire.

Having thus fully described my invention, what I claim as new and desire to secure by Letters Patent is:

A bicycle seat construction for use with a base having a longitudinally extending rib formation comprising a cushion member having inflatable side sections with bottom portions, a connecting rib for side sections elevated above the bottom portions and adapted to be supported by the rib formation of said base, said connecting rib extending forwardly of the side sections, an inflatable nose section extending from a point adjacent the forward ends of the side sections for the length of the extension of said connecting rib beyond said side sections, separating webs in said side sections, and said nose sections and said side sections provided with means forming a communication therebetween to permit the inflation thereof, a valve means in said nose section to permit the injection of air therein for the inflation of said section, a depending flange on each of said side and nose sections to retain said sections on said base and a depending extension on the flange on said nose section for protecting the valve in said nose section.

FRANK E. ROBINSON.

REFERENCES CITED

The following references are of record in the file of this patent:

UNITED STATES PATENTS

| Number  | Name    | Date           |
|---------|---------|----------------|
| 484,367 | Hicks   | Oct. 11, 1892  |
| 540,725 | Craig   | June 11, 1895  |
| 633,142 | Monahan | Sept. 19, 1899 |
| 653,588 | Norman  | July 10, 1900  |

FOREIGN PATENTS

| Number | Country       | Date          |
|--------|---------------|---------------|
| 6,193  | Great Britain | of 1890       |
| 19,725 | Great Britain | of 1901       |
| 98,346 | Sweden        | Jan. 11, 1940 |